(12) United States Patent
Inoue et al.

(10) Patent No.: US 9,150,168 B2
(45) Date of Patent: Oct. 6, 2015

(54) SLIDING DOOR WIRE HARNESS ROUTING STRUCTURE

(75) Inventors: Hiroshi Inoue, Yokkaichi (JP); Yoshihiro Maeda, Yokkaichi (JP); Jun Kurasawa, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 147 days.

(21) Appl. No.: 14/118,983

(22) PCT Filed: Apr. 19, 2012

(86) PCT No.: PCT/JP2012/060556
§ 371 (c)(1),
(2), (4) Date: Nov. 20, 2013

(87) PCT Pub. No.: WO2013/046776
PCT Pub. Date: Apr. 4, 2013

(65) Prior Publication Data
US 2014/0238740 A1      Aug. 28, 2014

(30) Foreign Application Priority Data
Sep. 26, 2011  (JP) .................................. 2011-209247

(51) Int. Cl.
*B60R 16/02* (2006.01)
*H02G 3/04* (2006.01)
*H02G 11/00* (2006.01)
*B60R 16/027* (2006.01)

(52) U.S. Cl.
CPC ............ *B60R 16/0215* (2013.01); *B60R 16/027* (2013.01); *H02G 3/0406* (2013.01); *H02G 11/006* (2013.01); *H02G 3/0475* (2013.01)

(58) Field of Classification Search
CPC ............. B60R 16/0215; B60R 16/027; H02G 3/0406; H02G 3/0475
USPC ...................................................... 174/72 A
See application file for complete search history.

(56) References Cited

U.S. PATENT DOCUMENTS 8,153,898 B2 * 4/2012 Aoki et al. .................. 174/72 A
2007/0152427 A1 * 7/2007 Olsen ............................ 280/649

FOREIGN PATENT DOCUMENTS

| JP | 2003-61237 | 2/2003 |
| JP | 2007-189761 | 7/2007 |
| JP | 2010-179685 | 8/2010 |
| JP | 2011-50182 | 3/2011 |

OTHER PUBLICATIONS

International Search Report of Jul. 10, 2012.

* cited by examiner

*Primary Examiner* — Timothy Thompson
*Assistant Examiner* — Charles Pizzuto
(74) *Attorney, Agent, or Firm* — Gerald E. Hespos; Michael J. Porco; Matthew T. Hespos

(57) ABSTRACT

A wire harness (5) to be bridged between a slide door (3) and a vehicle body (BO) is inserted into a harness guide (6). The harness guide (6) is coupled by a multitude of stepped links (10). Each link (10) is composed of a first coupling portion (11) and a second coupling portion (12) connected to the first coupling portion (11) via a step. Coupling pins (23) projecting in a vertical direction on the second coupling portions (12) are rotatably inserted into insertion holes (14) in the first coupling portions (11) of adjacent stepped links (10), whereby the entire harness guide (6) has a uniform inclination and the wire harness (5) inside is also arranged in a similar inclined posture. Thus, if the harness guide (6) is curved when opening or closing the slide door (3), the wire harness (5) also is curved, but simultaneously twisted, relieving stress.

8 Claims, 9 Drawing Sheets

SLIDING DOOR WIRE HARNESS ROUTING STRUCTURE

BACKGROUND

1. Field of the Invention

This invention relates to a slide door wire harness routing structure.

2. Description of the Related Art

Conventionally, a wire harness is bridged between a vehicle body side and a slide door side for power feeding to electrical components installed in a slide door of an automotive vehicle. An example of a routing structure in that case is disclosed in Japanese Unexamined Patent Publication No. 2010-179685.

A wire harness disclosed here is inserted into a harness guide. The harness guide is formed by successively rotatably connecting a multitude of link members in a length direction, and curved and displaced substantially in a horizontal plane according to opening and closing of a door.

A door-side end part of the harness guide is located before a body-side end part in a state where the slide door is closed and, conversely, located behind the body-side end part in a state where the slide door is open. Thus, a curving direction of the harness guide is switched during opening and closing movements of the slide door. In a top part of such a curve of the harness guide, a bending angle of the wire harness accommodated inside is also large. In addition, associated with a switch in the curving direction, an excessive force acts on the wire harness, which may lead to an increase in stress of the wire harness. Particularly, the use of thick wires in wire harnesses has been on the increase in recent years. Since such thick wires have a large stress, an early solution to this problem has been desired.

The present invention was completed in view of the above situation and aims to relieve stress in bending a wire harness.

SUMMARY OF THE INVENTION

The present invention is directed to a slide door wire harness routing structure for a wire harness to be bridged between a vehicle body on which an entrance is formed and a door that opens and closes the entrance by being slid in forward and backward directions relative to the vehicle body. The slide door wire harness routing structure includes a link member with a wall surface surrounding the wire harness and in which a first coupling portion is integrally arranged on one end side and a second coupling portion is integrally arranged on the other end side. A harness guide formed to be able to be entirely curved and displaced substantially in a horizontal direction by successively rotatably coupling the first coupling portion of the link member to a second coupling portion of another adjacent link member via a coupling pin arranged to extend substantially in a vertical direction. The harness guide further includes a stepped link member in which a step in a height direction is provided between the first and second coupling portions, whereby the wire harness is accommodated in a posture inclined with respect to the height direction in a region where the wire harness passes through the stepped link member.

According to the slide door wire harness routing structure of the present invention, since a plurality of link members forming the harness guide include the stepped link member in which the step in the height direction is set, the wire harness passing through the stepped link member is arranged in a state inclined in the height direction. On the other hand, when the harness guide is curved and displaced according to opening and closing of the door, the respective link members including the stepped link member rotate about the coupling pins arranged to extend in the vertical direction. That is, since the wire harness is arranged to intersect with a plane in which the stepped link member is rotationally displaced, it is simultaneously twisted about an axis line when being curved and displaced. Although a force associated with the bending of the harness guide has conventionally acted on the bent part of the wire harness in a concentrated manner, such a force is distributed due to the twist of the wire harness in the present invention, wherefore the life of the wire harness can be extended.

DETAILED DESCRIPTION OF THE PREFERRED EMBODIMENTS

Figure 1:
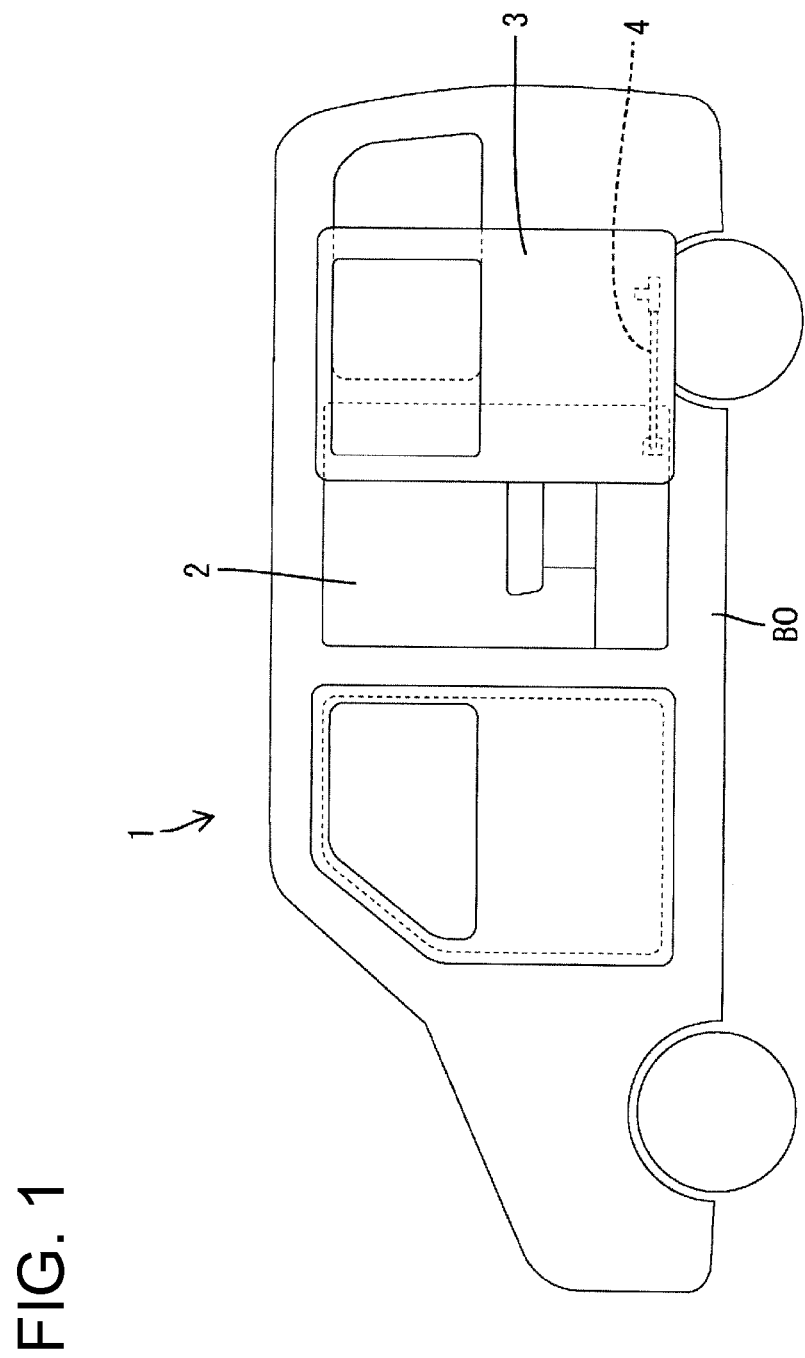
FIG. 1 is a side view of a vehicle according to a first embodiment.

Preferred embodiments of the slide door wire harness routing structure of the present invention are described.

The slide door wire harness routing structure of the present invention is such that at least either one of the first and second coupling portions of the stepped link member includes an error assembly restricting portion which interferes with another adjacent link member to make the coupling of the link members impossible when it is attempted to couple the link members in such improper postures vertically inverted from proper coupling postures.

In this way, even if it is erroneously attempted to couple the stepped link members in vertically inverted improper postures, at least either one of the first and second coupling portions interferes with another adjacent stepped link member, thereby making the coupling impossible. Thus, the stepped link members can be properly coupled even without paying any particular attention.

The harness guide is configured to include a range where a plurality of stepped link members having the step in the same direction are coupled along a length direction.

By including the part in which the plurality of stepped link members having the step in the same direction are coupled in this way, the harness guide can be set to have a moderate angle of inclination, for example, as compared with the case where the same step dimension is obtained by one stepped link member. Thus, the wire harness inside similarly has a moderate angle of inclination, wherefore a concentrated situation of a force acting on the wire harness according to opening and closing of the door can be relieved more.

The stepped link members are such that the second coupling portion of another stepped link member is inserted at the inner side of the first coupling portion and a protective projecting edge for concealing the end edge of the second coupling portion is formed on the inner surface of the first coupling portion.

Since the end edges of the second coupling portions are not exposed by being concealed by the protective projecting edges in this way when the stepped link members are coupled, a situation where the wire harness is damaged by being abraded by the end edges of the second coupling portions is prevented.

The harness guide formed by rotatably coupling the plurality of stepped link members is capable of being piled up in the height direction while being turned, thereby being formed into a spiral shape.

According to such a configuration, the entire harness guide can be made compact if being formed into a spiral shape. Thus, the harness guide does not take up a large installation space, which is advantageous such as at the time of storage and transportation.

The harness guide is formed by coupling the stepped link members having the step in the same direction over the entire range between the vehicle body and the door.

In this way, the wire harness is formed to have a uniform angle of inclination over the entire length range between the vehicle body and the door. Thus, for example, when the harness guide is further covered by a flexible protection tube, an effect of facilitating an inserting operation into the protection tube is obtained.

The harness guide is formed by coupling a group formed by coupling a plurality of stepped link members having the step in one height direction along the length direction and a group formed by coupling a plurality of stepped link members having the step in an opposite height direction along the length direction.

Since this can provide a height difference between an intermediate part of the harness guide in the length direction and end parts, interference with an interfering object can be avoided utilizing this height difference.

The harness guide is formed by coupling a group formed by coupling a plurality of the stepped link members and a group formed by a plurality of stepless flat link members.

In this way, the harness guide can be formed partly utilizing link members having an existing structure.

Next, specific first to third embodiments of a slide door wire harness routing structure of the present invention are described with reference to the drawings.

FIG. 1 shows a vehicle according to a first embodiment. An entrance 2 is open on a side surface of a vehicle 1. A slide door 3 which opens and closes the entrance 2 by being slid in forward and backward directions is mounted on the vehicle 1.

Figure 2:
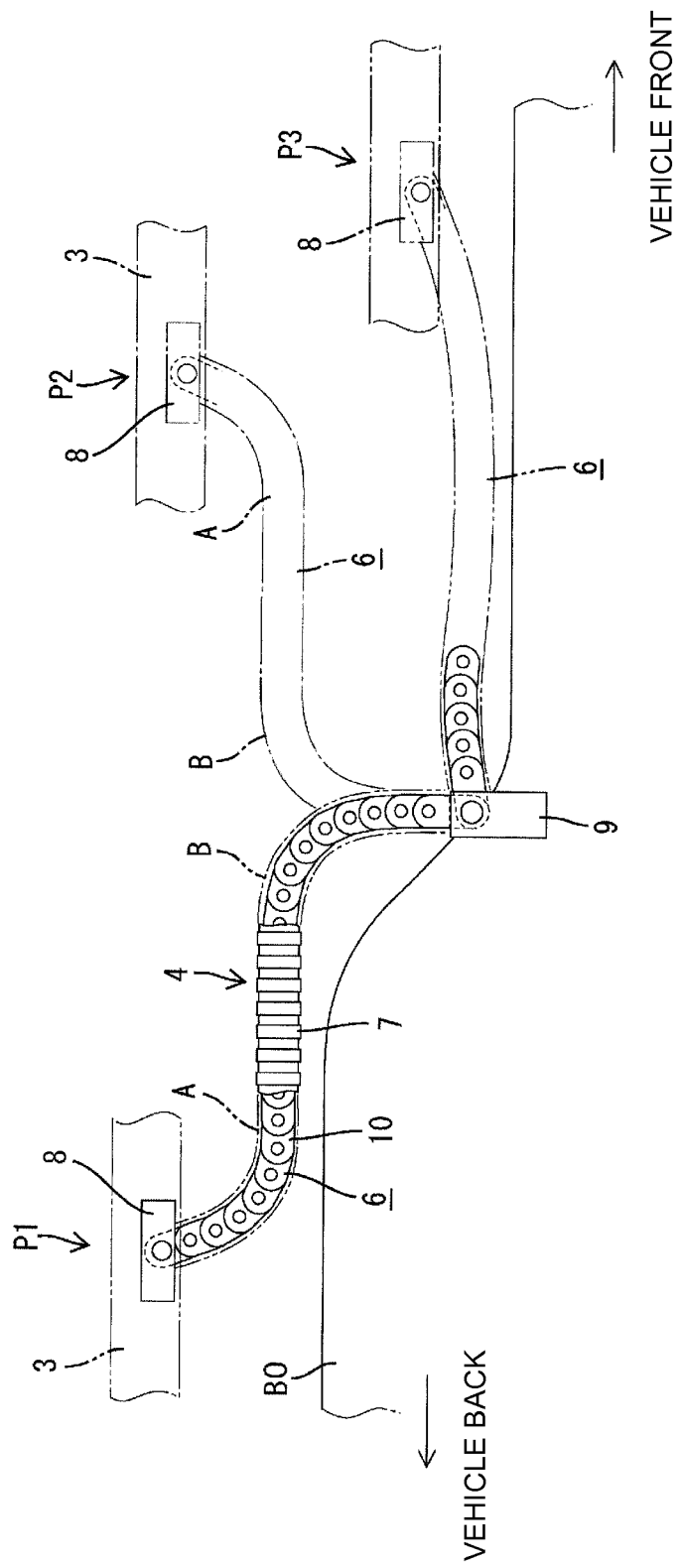
FIG. 2 is a plan view showing an operating state of a harness guide.

As shown in FIG. 2, a cable unit 4 is bridged between the slide door 3 and a vehicle body BO. The cable unit 4 includes a wire bundle (wire harness 5) for power feeding to various electrical components mounted in the slide door 3, a harness guide 6 into which this wire harness 5 is inserted, a flexible protection tube 7 covering the entire harness guide 6, a door-side bracket 8 mounted on a door-side end part of the harness guide 6 to fix the cable unit 4 to the door side and a body-side bracket 9 mounted on a body-side end part of the harness guide 6 to fix the cable unit 4 to the vehicle side.

The harness guide 6 is formed by successively connecting stepped link members 10 described below. In FIG. 2, a position indicated by P1 is the position of the door-side bracket 8 in a state where the slide door 3 opens the entrance 2, a position indicated by P3 is the position of the door-side bracket 8 in a state where the slide door 3 closes the entrance 2, and a position indicated by P2 is the position of the door-side bracket 8 while the slide door 3 is being opened or closed. As shown in FIG. 2, the door-side bracket 8 is located before the body-side bracket 9 when the slide door 3 is at a closed position and located behind the body-side bracket 9 when the slide door 3 is at an open position. This causes the harness guide 6 and the wire harness 5 to be curved and displaced in a substantially horizontal plane according to opening and closing movements of the slide door 3.

Figure 3:
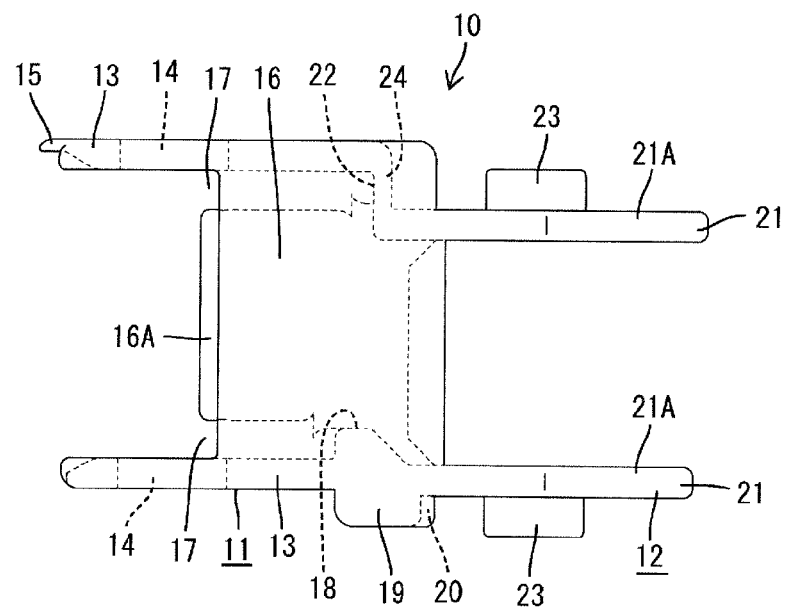
FIG. 3 is a front view of a stepped link member.
Figure 4:
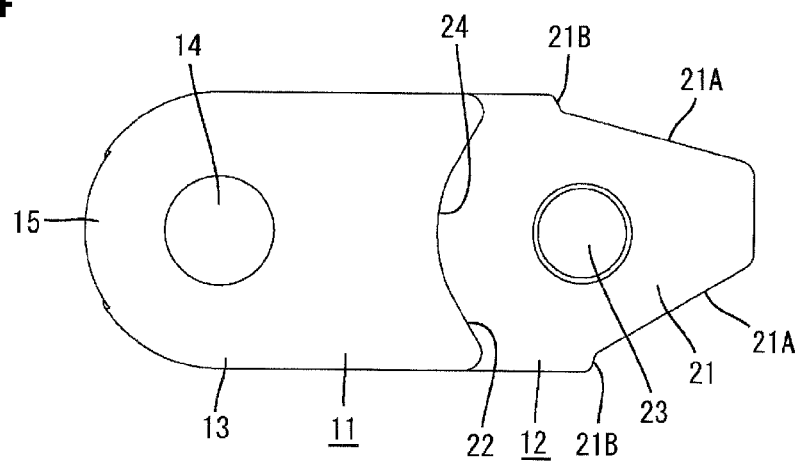
FIG. 4 is a plan view of the stepped link member.
Figure 5:
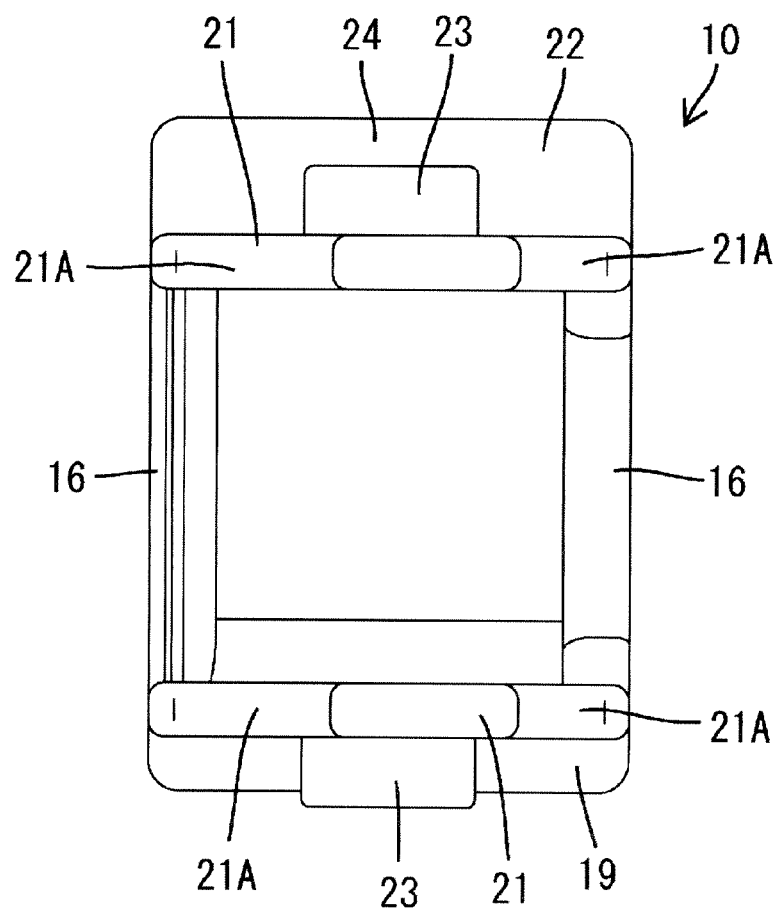
FIG. 5 is a side view of the stepped link member.

Next, each link member forming the harness guide 6 is described (see FIGS. 3 to 5). In this first embodiment, the harness guide 6 is formed by successively connecting the link members (stepped link members 10) all having the same shape. Each stepped link member 10 is integrally formed of a synthetic resin material, and an inner space thereof is so sized that the wire harness 5 can be inserted with a clearance around it. One half of the stepped link member 10 in the length direction is a first coupling portion 11 and the other half is a second coupling portion 12 connected back-to-back to the first coupling portion 11 while forming a step in a height direction.

The first coupling portion 11 includes a part formed into a substantially rectangular tube shape and can surround the wire harness 5 on four vertical and horizontal sides. Specifically, a pair of first coupling pieces 13 in the form of flat plates horizontally project from the upper and lower surfaces of the first coupling portion 11 while facing each other in the height direction. As shown in FIG. 4, insertion holes 14 respectively penetrate through the first coupling pieces 13 and are coaxially arranged in a vertical direction. The leading end edge of each first coupling piece 13 is formed to have a substantially semicircular shape in a plan view. However, as shown in FIG. 3, the shown upper one of the both first coupling pieces 13 is formed such that the leading end edge horizontally projects slightly more than that of the shown lower one. This projecting part forms an error assembly restricting portion 15 for preventing the stepped link members 10 from being coupled in vertically inverted improper postures when being coupled. This point is described again later.

Figure 6:
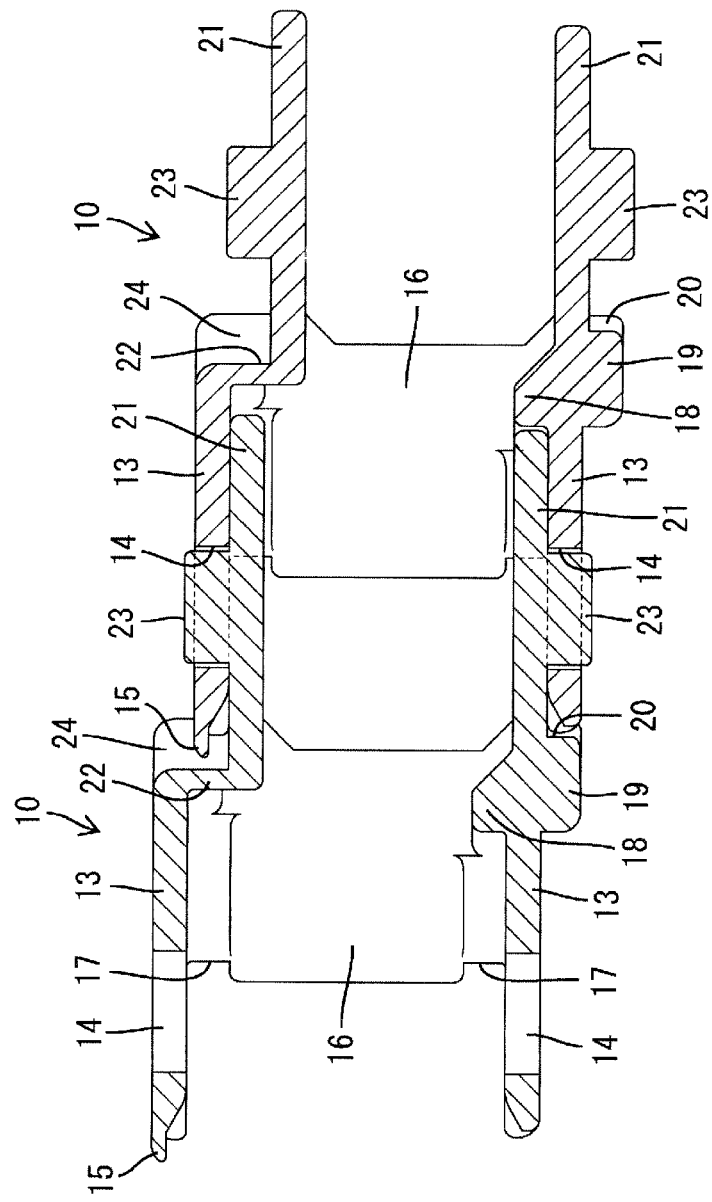
FIG. 6 is a section enlargedly showing a coupled state of stepped link members.

The both first coupling pieces 13 are coupled by a pair of side walls 16 facing in a horizontal direction. The both side walls 16 expose substantially halves of the both first coupling pieces 13 on the leading end side (parts including the insertion holes 14) and extend up to the second coupling portion 12 on an opposite side. An intermediate portion 16A is formed to project over a predetermined height range on the leading end edge of the back one of the both side walls 16 in FIG. 3. As shown in FIG. 6, parts vertically sandwiching the intermediate portion 16A are relatively recessed and respectively function as stopper portions 17 which fulfill a role in preventing relative rotation of the stepped link members 10. This point is also described again later.

A protective projecting edge 18 is formed on a boundary part with the second coupling portion 12 on the inner surface of the lower one of the both first coupling pieces 13 in FIG. 3. This protective projecting edge 18 is for avoiding the damage of the wire harness 5 inserted into the harness guide 6 due to interference with the leading end edges of second coupling pieces 21 to be described later. To that end, as shown in FIG. 6, the protective projecting edge 18 is formed to have a projection height substantially equal to the thickness of the second coupling piece 21 so as to be able to conceal an end part of the second coupling piece 21 to be described later when the stepped link members 10 are coupled to each other. Further, the protective projecting edge 18 is formed over the entire range between the both side walls 16. The upper surface of the protective projecting edge 18 is formed to be flat, and a surface thereof facing the second coupling piece 21 of the stepped link member 10 to be coupled is formed to be vertical, whereas an opposite surface is formed into a tapered surface.

As shown in FIG. 3, a protection wall 19 is formed over the entire width of the stepped link member 10 at a position facing the protective projecting edge 18 on the outer surface of the first coupling piece 13 formed with the protective projecting edge 18. As shown in FIG. 6, this protection wall 19 has a projection height substantially equal to the thickness of the first coupling piece 13. Although not shown in detail, a side surface of the protection wall 19 facing the second coupling portion 12 is formed with an arcuate concave surface 20 recessed toward a central side, which avoids interference with the leading end of the lower first coupling piece 13 of the adjacent stepped link member 10 when the stepped link members 10 are coupled to each other and permits the rotation of the adjacent stepped link member 10.

Note that a step wall 22 forming a step in the height direction to the second coupling piece 21 is formed on the upper first coupling piece 13 in FIG. 3. As shown in FIG. 6, the inner surface of this step wall 22 faces the leading end of the second coupling piece 21 of the adjacent stepped link member 10 while defining a small clearance when the stepped link members 10 are coupled to each other, thereby avoiding the interference of this leading end and the wire harness 5.

As described above, the second coupling portion 12 includes a pair of second coupling pieces 21 facing in the height direction. The spacing between the outer surfaces of the both second coupling pieces 21 in the height direction is set to be smaller than that between the inner surfaces of the both first coupling pieces 13 in the height direction. In a state where the stepped link members 10 are coupled, the inner surfaces of the first coupling pieces 13 face substantially in contact with the outer surfaces of the second coupling pieces 21. Coupling pins 23 formed into a short cylindrical shape coaxially project in the vertical direction from the outer surfaces of the both second coupling pieces 21. The both coupling pins 23 are insertable into the insertion holes 14, whereby the stepped link members 10 can be rotatably coupled.

As shown in FIG. 4, opposite side edges of the second coupling piece 21 are formed into tapered edges 21A so that the second coupling piece 21 is tapered toward the leading end, and locking portions 21B in the form of steps are formed on both shoulder portions of the second coupling piece 21. One of these locking portions 21B comes into contact with the stopper portion 17 of the first coupling portion 11 when the stepped link member 10 in the coupled state is rotated by a predetermined angle, thereby being able to prevent the stepped link member 10 from being rotated by more than the predetermined angle.

In FIG. 3, the inner surface of the lower one of the both second coupling pieces 21 is positioned substantially at the same height as the inner surface of the lower first coupling piece 13. However, since the step wall 22 is present between the upper second coupling piece 21 and the upper first coupling piece 13, the inner surface of the second coupling piece 21 is located at a lower height position.

Note that, as shown in FIG. 4, an identification recess 24 is formed on a side surface of the step wall 22 facing the coupling pin 23. This identification recess 24 is arcuately formed to be recessed toward a central part similarly to the concave surface 20, but is recessed more than (longer receding distance) than the concave surface 20 as shown in FIG. 3. This is because the error assembly restricting portion 15 of the upper first coupling piece 13 enters the identification recess 24 to allow a proper coupling relationship (relationship in which the coupling pins 23 are rotatably inserted into the insertion holes 14) when the stepped link members 10 are coupled in proper postures as shown in FIG. 6, but the error assembly restricting portion 15 interferes with the concave surface 20 to make the coupling of the stepped link members 10 impossible (the coupling pins 23 cannot be inserted into the insertion holes 14) when it is attempted to assemble the stepped link members 10 in vertically inverted improper postures.

Next, functions and effects of the first embodiment configured as described above are described. An operation of inserting the coupling pins 23 of the second coupling pieces 12 of an adjacent stepped link member 10 into the both insertion holes 14 of the first coupling portion 11 of each stepped link member 10 configured as described above is repeatedly performed. In this way, the long harness guide 6 having a uniform inclination with respect to the height direction can be obtained. The wire harness 5 is inserted into the harness guide 6 before the body-side and the door-side brackets 8,9 are attached to this harness guide 6, and the harness guide 6 is further inserted into the protection tube 7. Thereafter, the door-side bracket 8 is attached to one end side (upper end part of the inclination) of the harness guide 6 rotatably about a vertical axis and the body-side bracket 9 is attached to the other end side (lower end part of the inclination) rotatably about a vertical axis.

Figure 7:
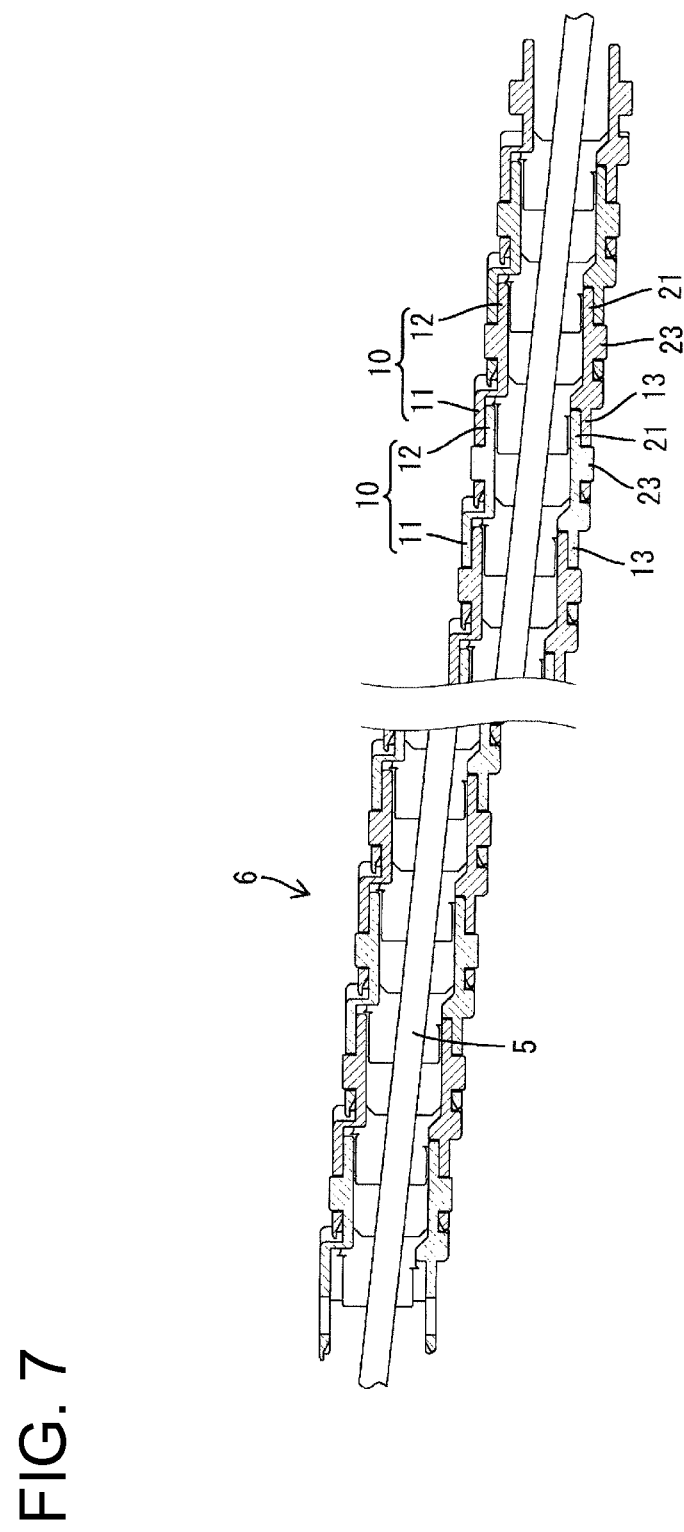
FIG. 7 is a front view in section showing a state where a wire harness is inserted in the harness guide.

In this way, the harness guide 6 is bridged between the vehicle body BO and the slide door 3. At this time, the both upper and lower surfaces of each stepped link member 10 of the harness guide 6 are substantially horizontal surfaces and the entire harness guide 6 is uniformly inclined downward from the door side to the body side. Further, the wire harness 5 inserted into the harness guide 6 is arranged in an inclined posture along the inclination of the harness guide 6 as shown in FIG. 7.

As shown in FIG. 2, the harness guide 6 is curved and displaced in the horizontal direction while the slide door 3 is moving between a state where the entrance 2 is fully open (state where the door-side bracket 8 is at the position P1) and a state where the entrance 2 is fully closed (state where the door-side bracket 8 is at the position P3). At the position P1, the harness guide 6 has bend top parts at two intermediate positions (parts indicated by A, B in FIG. 2). During a transition from P1 to P2, a bending direction changes at these two parts.

Also the wire harness 5 inserted in the harness guide 6 is similarly curved and deformed in the horizontal direction at parts corresponding to the parts indicated by A, B in FIG. 2. Thus, a stress corresponding to a bending degree acts on the parts of the wire harness 5 corresponding to these. Above all, the part B has a larger curvature than the part A and the bending direction changes before reaching the position P2. Thus, a larger bending stress acts on the part of the wire harness 5 corresponding to the part B.

Figure 8:
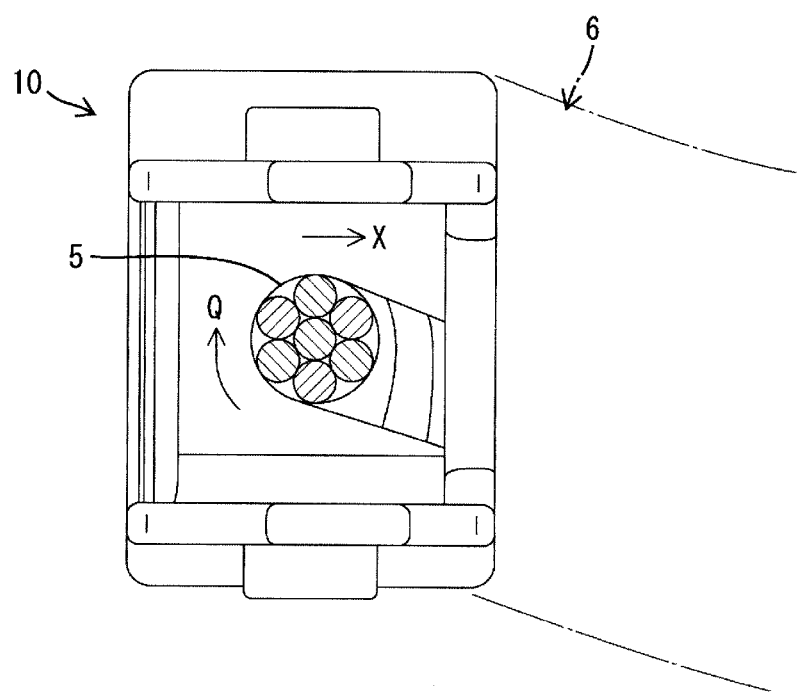
FIG. 8 is a side view in section showing a situation where the wire harness is twisted in the link member.

Further, when the harness guide 6 is curved and displaced, the both upper and lower surfaces of each stepped link member 10 rotate about the coupling pins 23 while being held substantially horizontal. On the other hand, since the wire harness 5 is inserted in an inclined posture with respect to the height direction of the harness guide 6 in the harness guide 6, i.e. since the wire harness 5 is arranged to intersect with a plane (horizontal plane) in which each stepped link member 10 is rotationally displaced, it is simultaneously twisted about an axis line (twist in a direction of an arrow Q shown in FIG. 8) when being curved and displaced (curving displacement with respect to a direction X shown in FIG. 8). Although a force associated with the bending of the harness guide 6 has conventionally acted on the bent part of the wire harness 5 in a concentrated manner, a stress resulting from such a force is distributed due to the twist of the wire harness 5 in this first embodiment, wherefore the life of the wire harness 5 can be extended.

The harness guide 6 of this first embodiment is entirely formed of the stepped link members 10 and has a uniform inclination over the entire length range. Thus, an angle of inclination of the wire harness 5 inserted inside is also relatively moderate, wherefore the impact of the twist can be distributed over a wide range and a stress can be more effectively distributed. Further, since the harness guide 6 is formed to ensure a necessary step as a whole utilizing the entire length rather than locally setting a large step, it is sufficient to use the protection tube 7 having a small diameter and the harness guide 6 is less likely to be caught, which results in an easier inserting operation.

Furthermore, even if it is attempted to couple the respective stepped link members 10 in vertically inverted improper postures, the error assembly restricting portion 15 interferes with the concave surface 20 to make such coupling impossible. Thus, an operator can reliably eliminate an erroneous operation even without paying any particular attention so as not to mishandle the assembling postures of the stepped link members 10.

Further, since the harness guide 6 is formed by connecting a multitude of the stepped link members 10 stepwise in the length direction, the harness guide 6 in a state as a single item can be formed into a spiral state. Specifically, the harness guide 6 can be formed into a spiral shape by being closely piled up in the height direction while being turned. Thus, a space taken up by the harness guide 6 in a state as a single item can be made as small as possible, wherefore a storage space can be small and the harness guide 6 can be easily carried around.

Figure 9:
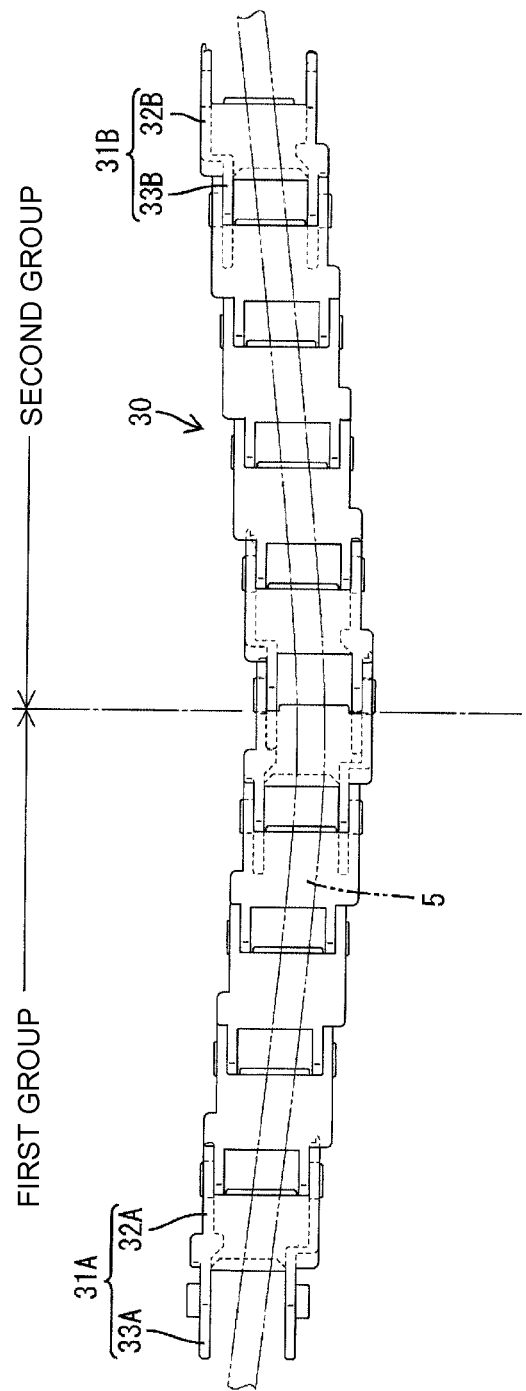
FIG. 9 is a front view showing a part of a harness guide according to a second embodiment.

FIG. 9 shows a second embodiment of the present invention. Although the harness guide 6 of the first embodiment is inclined in one direction, a harness guide 30 according to the second embodiment is formed such that a direction of inclination is vertically inverted at an intermediate position in a length direction.

The harness guide 30 according to the second embodiment is made up of two types of stepped link members 31A, 31B. One type is such that a downward step is set between a first coupling portion 32A and a second coupling portion 33A (stepped link member 31A belonging to a first group) and the other type is such that an upward step is set between a first coupling portion 32B and a second coupling portion 33B (stepped link member 31B belonging to a second group).

As shown in FIG. 9, a left half of the harness guide 30 of the second embodiment in the length direction is formed by coupling a plurality of stepped link members 31A belonging to the first group and a right half is formed by coupling a plurality of stepped link members 31B belonging to the second group. The inclination of a wire harness 5 inserted inside with respect to the height direction is also switched at an intermediate position in the length direction in conformity with a curved shape of the height direction 30 with respect to the height direction, but the wire harness 5 is curved while being twisted by an action similar to the aforementioned one when the harness guide 30 is curved and displaced in a horizontal direction. The other configuration is as in the first embodiment, wherefore functions and effects similar to the first embodiment can be obtained.

The second embodiment has the following advantage in addition to the functions and effects of the first embodiment. Specifically, since the harness guide 30 is arranged such that opposite end parts are at highest positions and a central part is at a lowest position, if an interfering object (e.g. step panel of an entrance 2 or the like) is present in a central part, the harness guide 30 can be arranged while avoiding this interfering object.

Note that the harness guide 30 can also be formed such that the central part in the length direction is highest instead of the form in the second embodiment.

Figure 10:
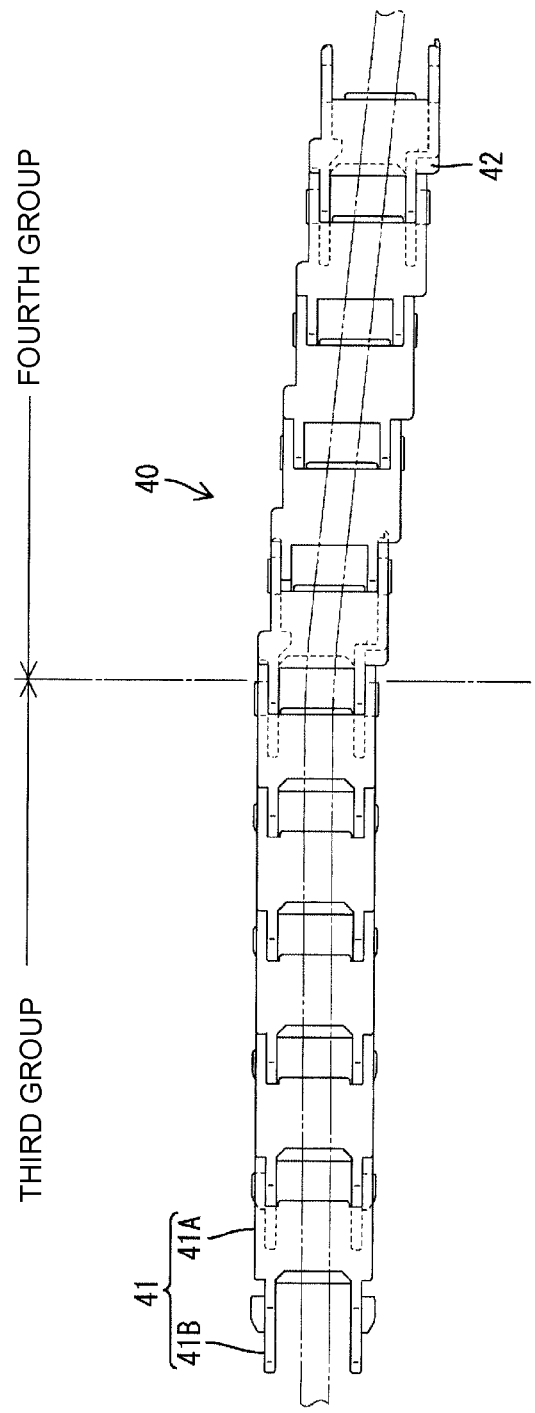
FIG. 10 is a front view showing a part of a harness guide according to a third embodiment.

FIG. 10 shows a third embodiment of the present invention. Although the harness guides 6, 30 are made up of the stepped link members 10, 31A, 31B over the entire length range in the both first and second embodiments, a harness guide 40 of the third embodiment includes normal stepless link members (flat link members 41) in a partial range.

A half of the harness guide 40 according to this third embodiment in a length direction (left half in FIG. 10: third group) is formed by successively coupling the flat link members 41. The flat link members 41 include no such step as to form a step in a height direction between first and second coupling portions 41A, 41B between the adjacent flat link members 41 when the flat link members 41 are coupled. A remaining half (fourth group) of the harness guide 40 in the length direction is formed by coupling a plurality of stepped link members 42, and a part formed by these stepped link members 42 is inclined downward to an end part as shown.

Note that the third embodiment is conceivably modified as follows.

The third and fourth groups are laterally switched.

The stepped link members 42 used have a step in a direction opposite to that in FIG. 10.

(1) and (2) are appropriately combined with the embodiment shown in FIG. 10.

In any of these cases, the other configuration is as in the first embodiment, wherefore functions and effects similar to the first embodiment can be obtained.

The present invention is not limited to the above described and illustrated embodiments. For example, the following embodiments are also included in the technical scope of the present invention.

Although the step between the first and second coupling portions 11, 12 is set only on one side (upper side) in the stepped link member 10 of the above first embodiment, it may be set on the lower side or on the both sides.

Although the link member includes the integral coupling pins in any of the above embodiments, the coupling pins may be separately formed.

The invention claimed is:

1. A slide door wire harness routing structure for a wire harness to be bridged between a vehicle body on which an entrance is formed and a door that opens and closes the entrance by being slid in forward and backward directions relative to the vehicle body, comprising:
    a link member that includes a wall surface surrounding the wire harness and in which a first coupling portion is integrally arranged on one end side and a second coupling portion is integrally arranged on the other end side; and
    a harness guide formed to be able to be entirely curved and displaced substantially in a horizontal direction by successively rotatably coupling the first coupling portion of the link member to a second coupling portion of another adjacent link member via a coupling pin arranged to extend substantially in a vertical direction;
    wherein the harness guide further includes a stepped link member in which a step in a height direction is provided between the first and second coupling portions, whereby the wire harness is accommodated in a posture inclined with respect to the height direction in a region where the wire harness passes through the stepped link member.

2. The slide door wire harness routing structure of claim 1, wherein at least one of the first and second coupling portions of the stepped link member includes an error assembly restricting portion that interferes with another adjacent link member to make the coupling of the link members impossible when it is attempted to couple the link members in such improper postures vertically inverted from proper coupling postures.

3. The slide door wire harness routing structure of claim 1, wherein the harness guide is configured to include a range where a plurality of stepped link members having the step in the same direction are coupled along a length direction.

4. The slide door wire harness routing structure of claim 3, wherein the stepped link members are such that the second coupling portion of another stepped link member is inserted at the inner side of the first coupling portion and a protective projecting edge for concealing the end edge of the second coupling portion is formed on the inner surface of the first coupling portion.

5. The slide door wire harness routing structure of claim 3, wherein the harness guide formed by rotatably coupling the plurality of stepped link members is capable of being piled up in the height direction while being turned, thereby being formed into a spiral shape.

6. The slide door wire harness routing structure of claim 3, wherein the harness guide is formed by coupling the stepped link members having the step in the same direction over the entire range between the vehicle body and the door.

7. The slide door wire harness routing structure of claim 3, wherein the harness guide is formed by coupling a group formed by coupling a plurality of stepped link members having the step in one height direction along the length direction and a group formed by coupling a plurality of stepped link members having the step in an opposite height direction along the length direction.

8. The slide door wire harness routing structure of claim 3, wherein the harness guide is formed by coupling a group formed by coupling a plurality of the stepped link members and a group formed by a plurality of stepless flat link members.

* * * * *